United States Patent [19]
Yamaguchi et al.

[11] Patent Number: 5,140,739
[45] Date of Patent: Aug. 25, 1992

[54] SPINDLE UNIT AND TOOL CLAMPING DEVICE THEREIN FOR MACHINE TOOLS

[75] Inventors: Yoshinori Yamaguchi, Sakurai; Kentaro Shino; Kiyoshi Inada, both of Nara; Hiroshi Hanaoka, Kawasaki, all of Japan

[73] Assignee: Kabushiki Kaisha Mori Seiki Seisakusho, Yamatokoriyama, Japan

[21] Appl. No.: 638,772

[22] Filed: Jan. 8, 1991

[30] Foreign Application Priority Data

Jan. 8, 1990 [JP] Japan ................................ 2-2362
Sep. 19, 1990 [JP] Japan .............................. 2-251362

[51] Int. Cl.⁵ ........................... B23C 5/26; B23Q 3/157
[52] U.S. Cl. ....................................... 483/18; 409/233; 483/21
[58] Field of Search ................. 29/568; 409/231, 232, 409/233, 234; 279/1 R; 408/239, 239 A, 240

[56] References Cited

U.S. PATENT DOCUMENTS

2,942,891 6/1960 Zale ...................... 279/1 R
3,240,503 3/1966 Watson et al. ............ 409/231 X
4,818,161 4/1989 Cook ........................ 409/233

Primary Examiner—Z. R. Bilinsky
Attorney, Agent, or Firm—Antonelli, Terry Stout & Kraus

[57] ABSTRACT

A spindle unit comprising a solid shaft main spindle of a highly rigid material such as cemented carbide, with the main spindle being rotatably supported in a spindle head by bearings less apt to generate heat. A tool-clamping device including an adapter attached to a front end of the main spindle, and a tool holder carries a rotary tool. On of the adapter and the holder comprises a short columnar lug, with the other of the adapter and holder comprising a cylindrical hole shrinkage-fitted on the lug. The member having the hole is made of a material having a coefficient of thermal expansion lower than a coefficient of thermal expansion of the other member. The tool-clamping device further comprises heating and cooling devices for heating and cooling the member having the hole.

12 Claims, 6 Drawing Sheets

SPINDLE UNIT AND TOOL CLAMPING DEVICE THEREIN FOR MACHINE TOOLS

BACKGROUND OF THE INVENTION

1. Field of the Invention

The invention relates to a spindle unit and a tool clamping device for numerically controlled (NC) machine tool comprising a main spindle provided at its end with a means for clamping rotary tools.

2. DESCRIPTION OF PRIOR ART

It has been common practice for the spindle unit of machine tools to preferably employ large-sized and tough bearings in order to provide higher rigidity to a main spindle, and small-sized bearings are effective for suppressing heat generation at high rotational speeds of the main spindle. According to such common practice, the highly rigid spindles can be used only in case of lower rotational speeds, while the other spindles, designed for higher rotational speeds, inevitably are of lower rigidity. In other words, the prior art has taught that high rotational speeds and satisfactory high rigidity cannot be given to the main spindle.

Figure 7:
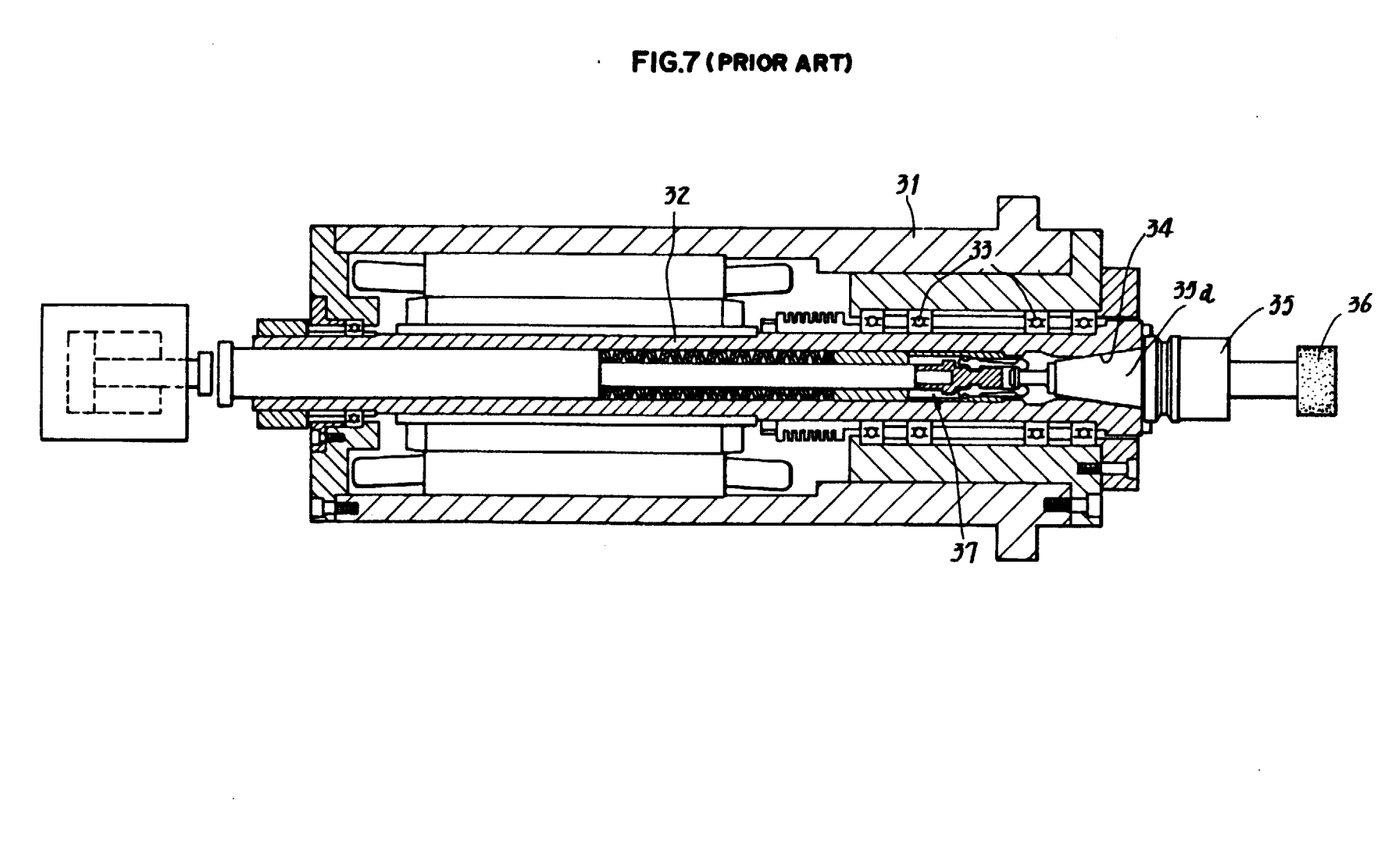
FIG. 7 is a horizontal cross-sectional view of portions of a prior art spindle unit.

A prior art spindle as shown in FIG. 7 comprising a main spindle 32 provided at its end with a means for clamping rotary tools and is formed to be a cylinder of hollow shaft rotatably supported by a spindle head 31 through bearings 33. Fitted in an axially extending hole of the cylinder is a tool-clamping device 37 as a part of the means for clamping the rotary tools. A tapered portion 34 is formed at a front end of the main spindle so as to tightly hold a rotary tool. In this example, a grind stone 36 is fixed to a tool holder 35 whose tapered portion 35a firmly engages with the tapered portion 34 of the main spindle. The tool holder 35 is pulled strongly and inwardly of the main spindle 32.

In such a prior art apparatus, an outer diameter of the main spindle 32 depends upon a size of the tapered portion 35a of the tool holder used. Therefore, the spindle 32 should, in general, have a large diameter such that it is difficult to drive the spindle to rotate at a high speed with a reduced size of the bearings. If such a large main spindle 32 is forcibly rotated at a high speed, then the bearings generate an increased amount of heat, thereby not only serious affecting the manufacturing precision but also giving rise to a burning of an jamming between the bearings and the spindle. Furthermore, the tool clamping device 37 and the axially extending hole of the main spindle 32 will, in such an event, unbalance the rotation thereof and cause a rocking rotation. As a result, undesirable vibration and noise from the apparatus are produced.

In addition, the main spindle 32 in the prior art apparatus is manufactured through two or more separate steps in order to form an inner hollow space, the taper portion, and other portions thereof. Consequently, the spindle is likely to loose its rotational balance. In order to avoid such a problem by improving the precision of the spindle, a manufacturing technique at an extraordinary high level of precision will be required to produce the main spindle.

It will thus be apparent that the prior art spindle units have indeed been incapable of precisely machining high precision mechanical parts.

However, there are increasing demands for high precision in high-speed grinding and high-speed cutting.

SUMMARY OF THE INVENTION

An object of the present invention is to provide a spindle unit comprising a main spindle having at its end a simple means for clamping rotary tools, with the main spindle being high rigid and rotatable at high speeds so as to enable mechanical parts to be ground or cut with high precision by high speed rotation of the main spindle.

According to the invention, a main spindle is formed as a solid shaft or rod made of a highly rigid material such as, for example, cemented carbide or hard metal. The main spindle is rotatably supported in a spindle head by bearings which are made of ceramic or other materials generating less heat. An adapter, formed as a short rod and having either a columnar lug or a cylindrical hole is secured to a front end of the main spindle by a shrinkage fit, with the lug or hole being coaxial with the main shaft. A tool holder carrying a rotary tool is also replaceably shrinkage-fitted to the lug or hole of the adapter, wherein the tool holder and the adapter cooperate to constitute a tool clamping device in the spindle unit.

The columnar lug in the tool-clamping device is formed either on the adapter at the front end of the main spindle or on the tool holder carrying the rotary tool. Correspondingly, the cylindrical hole is formed either in the tool holder or in the adapter so as to be shrinkage-fitted to the columnar lug. The adapter or tool holder which comprises the lug has a coefficient of thermal expansion less than a coefficient of thermal expansion of the tool holder or adapter which comprises the hole. The tool-clamping device further comprises a means for heating and cooling one of the adapter and the tool holder, which adapter or holder is provided with the cylindrical hole.

The heating and cooling means may be disposed either in proximity to the front end of the spindle head, or, alternatively, on a tool transporter.

A vibrator may be employed to vibrate the adapter or holder while being heated or cooled, in order to facilitate tight engagement or smooth disengagement of the adapter with or from the tool holder.

It is also preferable to employ a pressing means for urging the tool holder towards the adapter so as to surely fit the former to the latter.

The spindle unit and the tool-clamping device therein, constructed as described above, operate as follows. At first, the tool holder or adapter, having the columnar lug, is caused to fit in the adapter or tool holder which has the cylindrical hole and is in a heated state. After that, the adapter or tool holder having the hole will be cooled down to be tightly connected to the tool holder or adapter due to the shrinkage fit as a result, the rotary tool carried by the tool holder is clamped by the main spindle in this manner.

To bring the tool holder or adapter having the columnar lug into its unclamped state, the other member which has the cylindrical hole is again heated. In such an unclamped state, the tool will be replaced with another tool.

The vibrator may be utilized to vibrate the tool holder or the adapter while the tool holder is being urged towards the adapter by the pressing means. Thus, the holder will be tightly secured to the adapter such that the shrinkage fit enhances a high precision and a high rigidity connection.

It is further noted that the main spindle is a solid shaft made of cemented carbide or other highly rigid material, and rotation balance is excellent as a whole including the tool-clamping device secured to the front end of the main spindle and carrying the rotary tool.

The spindle unit in the invention is characterized in that the tool-clamping device at the front end of the main spindle is of a simplified structure. The adapter fixed to the main spindle in the device is tightly shrinkage-fitted to the tool holder carrying the tool. A higher accuracy in changing tools is ensured providing a high rigidity. Further, any orientation work is not necessary because the main spindle need not be stopped at a fixed position as required in the prior art.

The main spindle in the invention can be of a smaller diameter without impairing its rigidity since it is a solid shaft formed of the highly rigid material. The solid shaft need only be machined on its outer surface thereby simplifying the machining process for manufacturing the main spindle. Rotations precision at higher speeds is excellent due to the fact that the bearings are of a smaller size and made of a suitable ceramic material hardly generating a significant amount of heat, and also due to the fact that the rigidity and rotation balance including the tool-clamping device and the rotary tool carried thereby is remarkably improved. Thus, higher rotational speeds and higher rigidity are ensured at the same time. The main spindle can now be rotated at sufficiently high speeds to perform high precision grinding and cutting operations thereby enabling the machining in the order of sub-micron meters. In an example wherein the spindle unit and tool-clamping device in the invention are used with grindstones, the compound or multiple grinding operations can be carried out at a higher precision and at higher speeds. Heavy-duty grinding at high speeds will also be possible because a distance from the bearings of the main spindle to the grindstones can be minimized due to the simple structure of the adapter and tool holder so as to improve rigidity and safety and because the clamping force is not impaired even at high rotational speeds. In addition, the adapter and the tool holder in the tool-clamping device are simple in structure and are capable of being manufactured at a low cost so that disposable grindstones may be possible.

DETAILED DESCRIPTION OF PREFERRED EMBODIMENTS

Figure 1:
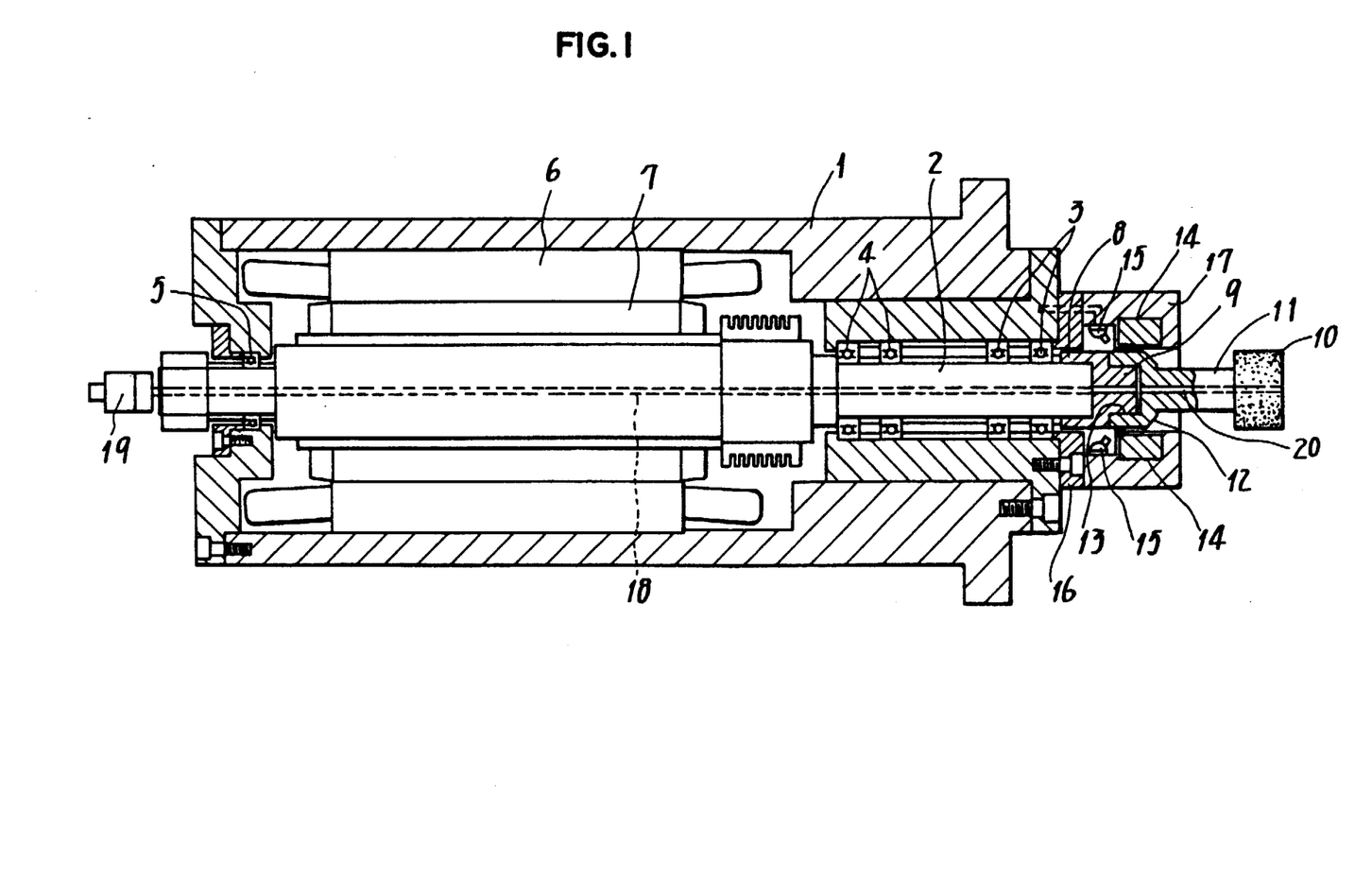
FIG. 1 is a horizontal cross-sectional view of portions of a spindle unit of an embodiment of the present invention.

Referring now to the drawings wherein like reference numerals are used throughout the various views to designate like parts and, more particularly, to FIG. 1, according to this FIGURE, a machine tool comprises a spindle unit having a spindle head 1 and a main spindle 2 formed as a solid shaft of cemented carbide or other appropriate hard metal. The main spindle 2 is rotatably supported by bearings 3, 4 and 5 in the spindle head 1, with the bearings 3, 4, 5 being made of an appropriate ceramic material hardly generating a noticeable amount of heat. An electric motor 6, mounted in the spindle head 1, comprises a roller 7 directly connected to the main spindle 2 so as to drive the same.

An adapter 8 attaches a rotary tool 10, for example, a grindstone, to a front end of the main spindle 2. A columnar lug 9 is integrally formed at a front portion of the adapter 8. A rear portion of the adapter is shrinkage-fitted to the front end of the main spindle 2, with the columnar lug 9 extending coaxially with the main spindle 2. Invar, having a thermal coefficient of expansion of $0.1 \times 10^{-6}$, ceramic material or other materials of low thermal coefficients of expansion may be used to make the adapter 8.

A supporting shaft 11 supports the grindstone 10 and comprises, at its rear end, a tool holder 12. The tool holder 12 has a cylindrical hole 13 which is shrinkage-fitted to the lug 9 of the adapter 8. The tool holder 12 is made of Nickel-Chromium steel having a thermal coefficient of expansion of $11 \times 10^{-6}$ and is integral with the supporting shaft 11.

A rapid heating device 14 comprises an electric heater, and a rapid cooling device 15 is adapted to jet cold air or cold water. Both the cooling devices 14 and 15 are secured to a ring-like bracket 17 fixed to and protruding from a bearing retainer 16 disposed at the front end of the spindle head 1. The rapid heating and cooling devices 14 and 15 are positioned close to the adapter 8. To facilitate the cooling by the rapid cooling device 15, it may be useful to employ an assisting means. In the assisting means, a passage 18 penetrates a core portion centrally and axially of the main spindle 2, and cutting oil or cooling water flows into the passage 18 through a rotary joint 19. The cutting oil or cooling water will flow out on demand through a central bore 20 of the supporting shaft 11.

Figure 2:
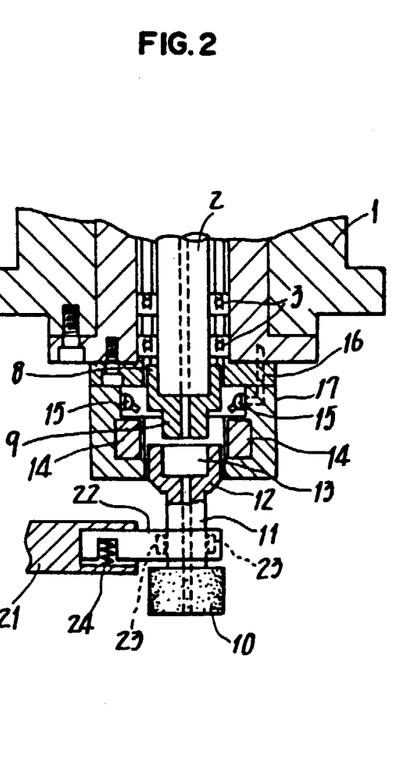
FIGS. 2-4 are horizontal partial cross-sectional views respectively illustrating steps of clamping a tool in the tool-clamping device of the present invention.

A transporting arm 21 is a principle part of a tool transporter for the grindstone 10. As shown in FIG. 2, the arm 21 comprises a finger 22 attached to an end of the arm 21 and picks up out of a magazine (not shown) a selected one of supporting shafts 11 respectively carrying grindstones 10. The transporting arm 21 thus brings the selected grindstone 10 into proximity of the front end of the main spindle 2 where the grindstones 10 are changed. A vibrator 23 is incorporated in the finger 22 so as to vibrate the tool holder 12 through the supporting shaft 11 gripped by the finger 22. Further, the finger 22 is connected to the arm 21 in such a manner that a relative movement is allowed between them. A coiled spring 24 constantly urges the finger toward the main spindle. In detail, the finger 22, movable relative to the arm 21 and urged in this manner, constitutes a pressing means by which the tool holder 12, gripped by the finger 22, is pressed into engagement with the adapter 8 secured to the main spindle.

Figure 3:
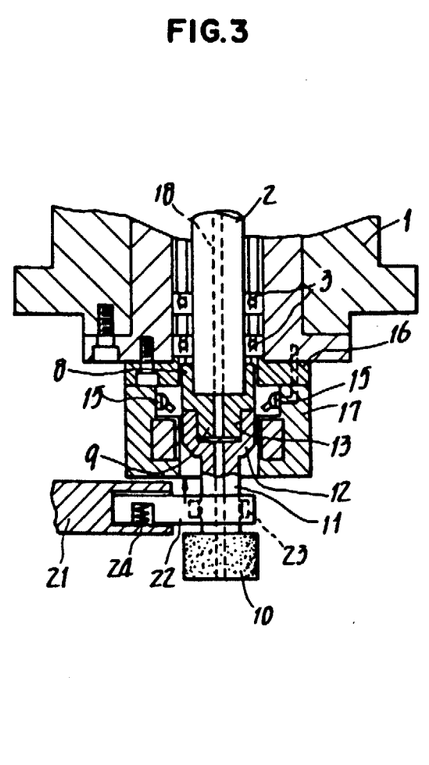
Figure 4:
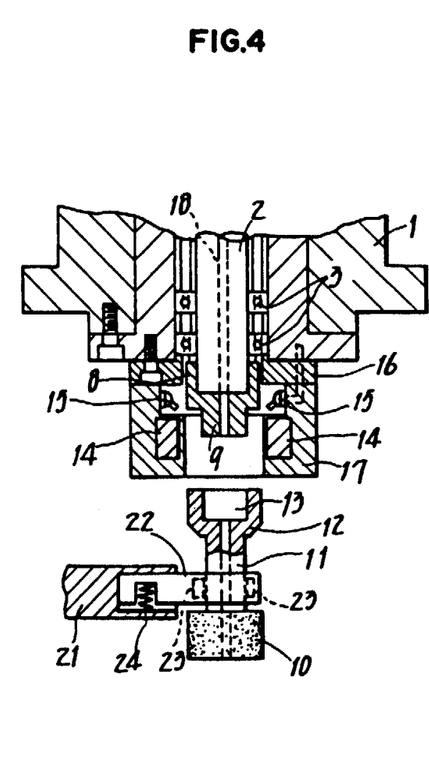

FIGS. 2 to 4 illustrate steps in the process of clamping the grindstone 10 by the tool-clamping device described above.

At first, as shown in FIG. 2, the finger 22 of the transporting arm 21 grips the supporting shaft 11 and thereby moves the grindstone 10 to the proximity of the main spindles' front end where the grindstones are changed and, at the proximity, the engaging portions of the adapter 8 and the tool holder 12 are cleaned. Then the rapid heating device 14 heats the holder 12 to increase an inner diameter of the cylindrical hole 13 due to thermal expansion. Thus, it is possible for the hole 13 to be fitted on the columnar lug 9 of the adapter 8. In order that the lug 9 may be tightly inserted in the hole 13, the vibrator 23 and imparts vibration or tremor to the holder 12 through the supporting shaft 11 while, at the same time, the coiled spring 24 causes the finger 22 to urge the holder 12 against the adapter 8.

After such an engaging operation is finished, the rapid heating device 14 will stop heating the members, with the rapid cooling device 15 thereafter starting to cool the holder 12. The thus cooled holder 12 is fixedly shrinkage-fitted on the adapter 8 so that the grindstone 10 is clamped by the front end of the main spindle 2. The vibrator 23 may operate also during this cooling step so as to impart vibration to the holder 12. The coiled spring 24 will force by means of the finger 22 the thus vibrated holder 12 onto the adapter 8, whereby the holder 12 and the adapter 8 are perfectly engaged with each other with a high precision and high rigidity (FIG. 3). Subsequently, finger 22 of the transporting arm 21 will release the supporting shaft 11 before leaving the main spindle 2 and permitting it to start its grinding operation.

To replace the grindstone 10 clamped on the main spindle 2 with another grindstone, the rapid heating device 14 is actuated again. The tool holder 12 of a higher coefficient of thermal expansion is thus heated to enlarge its cylindrical hole 13 so that the adapter 8 and holder 12 are disengaged from each other, with the main spindle 2 thus unclamping the grindstone 10. Consequently, the finger 22 of the transporting arm 21 grips the supporting shaft 11 and pulls it away from the main spindle 2 in an axial direction thereof while the vibrator 23 is vibrating the holder 12 through the shaft 11. The cylindrical hole 13 of the holder 12 is disengaged in this manner from the columnar lug 9 of the adapter 8, and the grindstone is replaced (FIG. 4).

Figure 5:
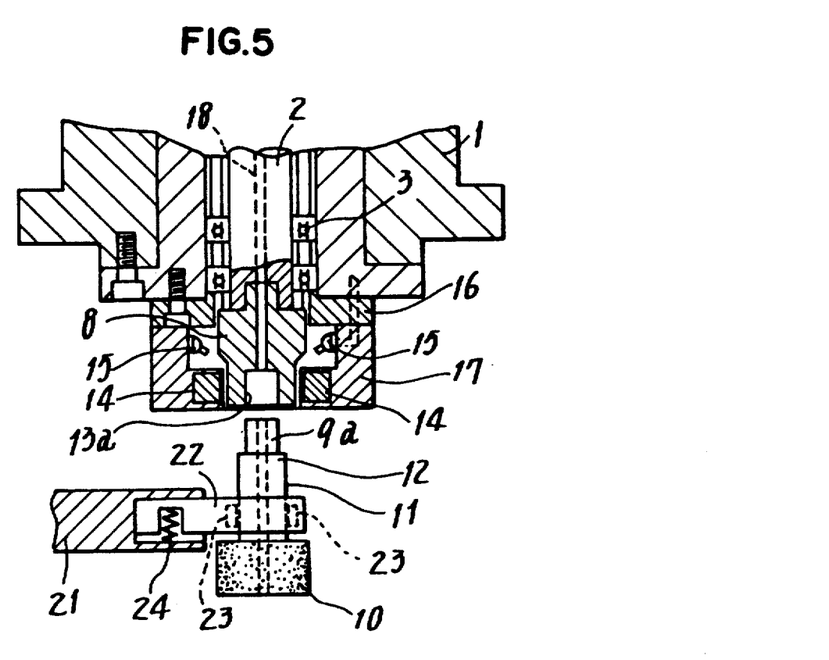
FIG. 5 is a horizontal partial cross-sectional view of a portion of another embodiment of the present invention.

Though the adapter 8 attached to the main spindle 2 comprises the lug 9, with the holder 12 for the grindstone comprising the hole 13 in the embodiment described above, it is also possible in another embodiment for the adapter 8 to comprise a cylindrical hole 13a instead of the lug, and the holder 12 to comprise a columnar lug 9a in place of the hole as shown in FIG. 5. In this case, Invar, ceramic material or other suitable materials of a lower coefficient of thermal expansion may be utilized to manufacture the supporting shaft 11 and the tool holder 12 and be integral therewith the lug 9a. Correspondingly, Nickel-Chromium steel will be used to form the adapter comprising the hole 13a. It is preferably that, in order to prevent the main spindle 2 from being thermally deformed due to the heating of the adapter 8, that the adapter is longer than in the first embodiment and is provided with heat-radiating fins or the like.

Figure 6:
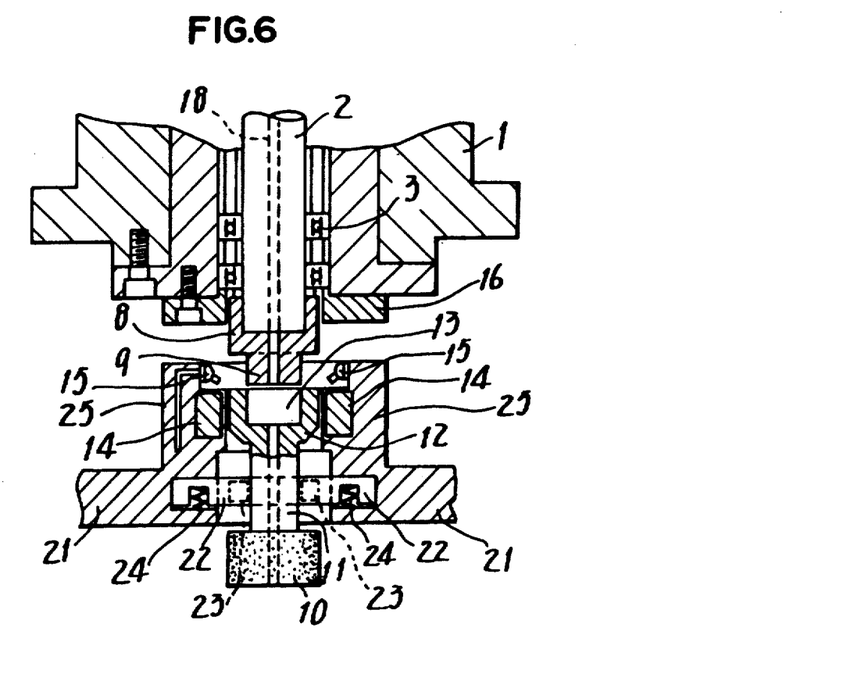
FIG. 6 is a horizontal and partial cross-sectional view of portions of yet another embodiment of the present invention.

FIG. 6 shows another embodiment wherein a pair of transporting arms 21 and 21 are arranged so as to face one another. Each arm 21 comprises a semicircular bracket 25 which integrally protrudes therefrom and has the rapid heating device 14 as well as the rapid cooling device 15 built therein. The fingers 22 and corresponding coiled springs 24 are also incorporated in the arms 21 so as to form a pressing means. Such a structure is advantageous in that the heating and cooling of the relevant members can be carried out during transportation of the rotary tools thereby improving efficiency in tool changing operations.

Comparative tests were conducted to compare the performance of the spindle unit according to the present invention shown in FIG. 1 with that of the prior art apparatus shown in FIG. 7. Rotational precision (i.e., vibrational rotation) at high speeds as well as axial elongation and temperature rise of the main spindles were measured in the comparative tests. Results of the tests are as follows.

(1) Rotational precision:

Vibration or rolling which accompanies the high-speed rotation of the rotary tools 10 and 36 were detected by two non-contacting sensors. One of the sensors was disposed on a machine table in direction "X" (i.e., along an abscissa), with the other sensor in the direction "Y" (i.e., along the ordinate).

Figure 8A:
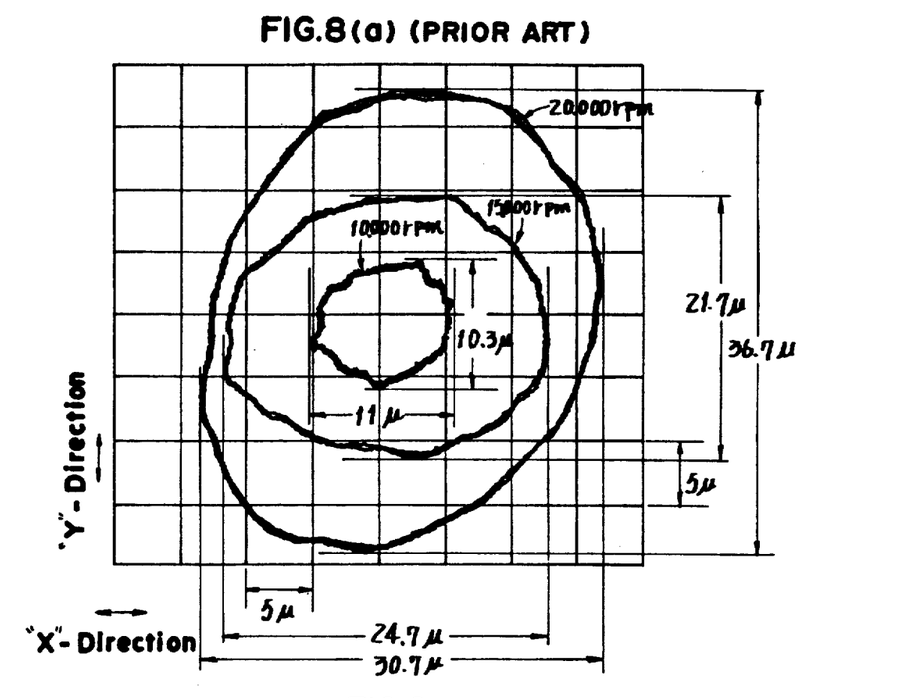
FIG. 8(a) is a graphical illustration of rotational precision in the prior art spindle unit of FIG. 7.

FIG. 8($a$) shows the test result obtained for the prior art apparatus with respect to the high-speed rotational precision of the prior art apparatus. As will be seen from FIG. 8($a$), the vibration or rolling was 0.0307 mm in the direction "X" and 0.0367 mm in the direction "Y", for rotation at 20,000 rpm of the main spindle. It will be apparent that the rotational precision diminishes beyond the speed of 15,000 rpm.

Figure 8B:
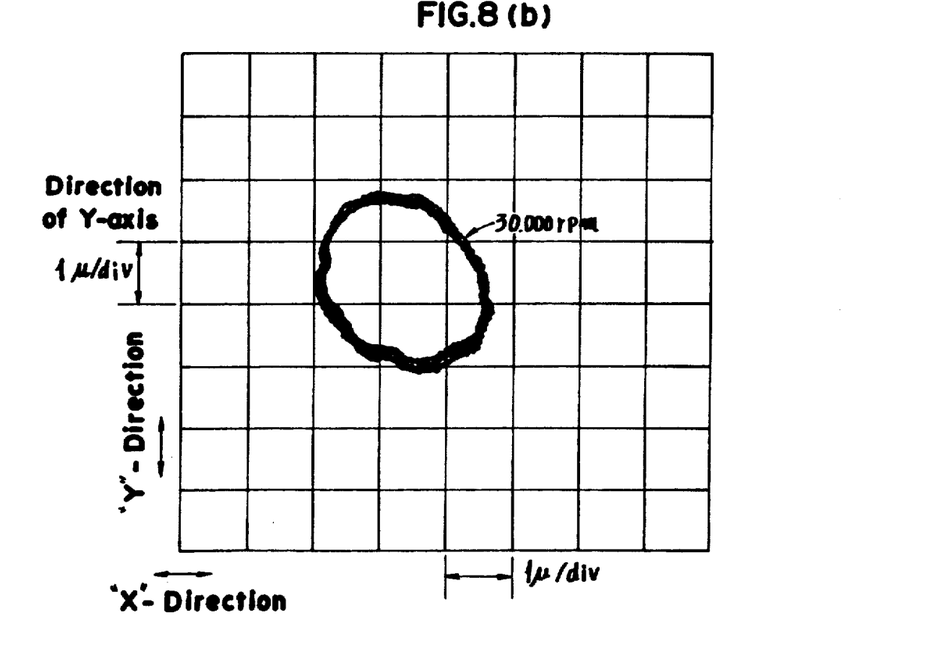
FIG. 8(b) is a graphical illustration of rotational precision in the spindle unit according to the present invention.

FIG. 8($b$) shows an improved high-speed rotational precision in the spindle unit in the invention. The vibration or rolling was observed to be 0.0028 mm in the direction "X" and 0.0029 mm in the direction "Y", even for rotation at 30,000 rpm of the main spindle. Thus, the vibration of the main spindle in the invention proved to be one tenth or less than that of the prior art spindle, despite an increase in rotational speed, increased by 10,000 rpm. This result shows that the machining operations of higher precision at higher speeds are possible using the apparatus and device of the invention.

(2) Longitudinal elongation and temperature rise of the main spindles:

The elongation of the main spindles in their longitudinal direction (i.e., direction "Z") was measured by means of another non-contacting sensor disposed to face the rotary tool 10 or 36 rotating at high speeds. A thermocouple was attached to the front cover of the main spindle so as to measure the temperature rise.

Figure 9A:
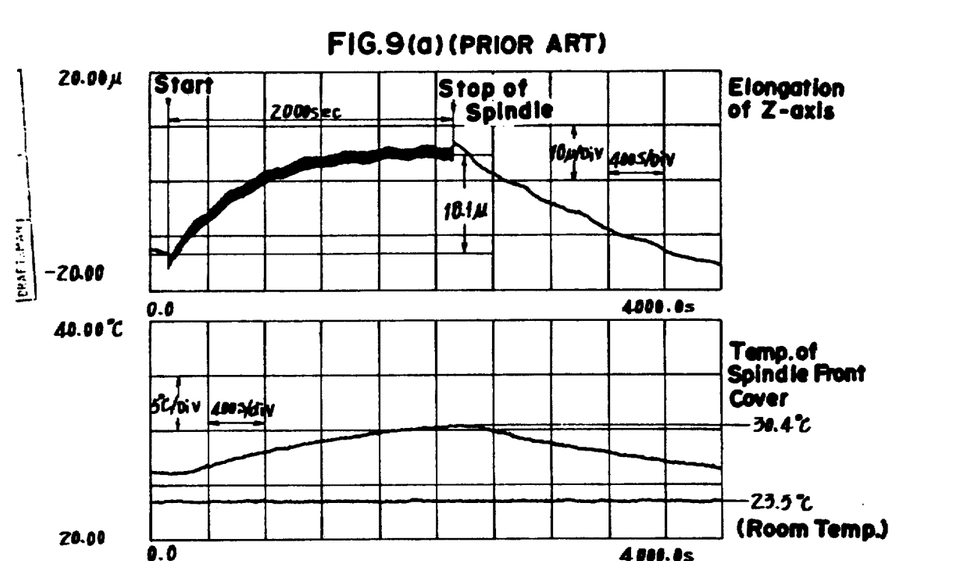
FIG. 9(a) is a graphical illustration of the elongation in an axial direction and the temperature rise of the main spindle in the prior art spindle unit.

FIG. 9($a$) indicates that, in the prior art spindle unit, the longitudinal elongation was 18.1 m, and the temperature rise of the front cover was 6.9° C. for the main spindle rotating at 12,000 rpm.

Figure 9B:
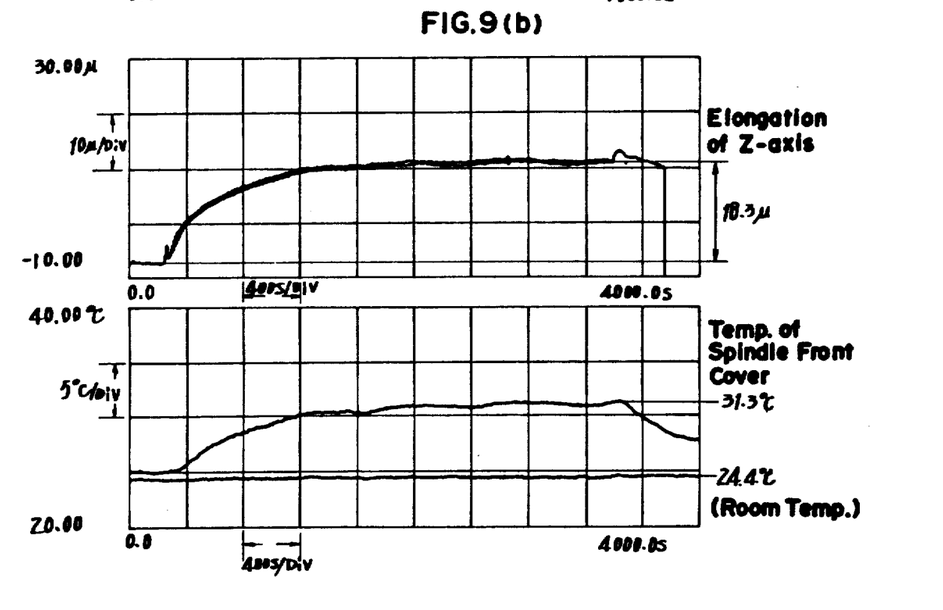
FIG. 9(b) is a graphical illustration of the elongation in an axial direction and the temperature rise of the main spindle in the apparatus according to the present invention.

FIG. 9($b$) shows that, in the spindle unit of the invention, the longitudinal elongation was 18.3 $\mu$m, and the temperature rise of the front cover was 6.9° C. for the main spindle rotating at an extraordinary high-speed of 30,000 rpm.

Notwithstanding the great difference in rotational speed of 18,000 rpm, the longitudinal elongation and temperature rise of the main spindle of the invention remained almost equal to that of the prior art main spindle. The main spindle in the apparatus of the invention shows less thermal expansion in the longitudinal direction so that machine precision is stable thereby enabling a high-precision machining at higher speeds.

What is claimed is:

1. A spindle unit for machine tools, comprising:
   a solid shaft main spindle formed of a rigid material;
   a spindle head rotatably supporting the main spindle;
   bearing means fashioned of a material which generates a small amount of heat;
   an adapter shrinkage-fitted on a front end of the main spindle and having a short columnar lug integral with and coaxial to the main spindle; and
   a tool-clamping device including a tool holder having a cylindrical hole formed therein adapted to be shrinkage-fitted tightly on the columnar lug, wherein the tool holder is disengageable from the adapter so as to enable a replacement of the rotary tool with another rotary tool.

2. A spindle unit for machine tools according to claim 1, wherein the rigid material of the solid shaft main spindle is a cemented carbide.

3. A spindle unit for machine tools according to claim 1, wherein the material of the bearing means is a ceramic material.

4. A tool-clamping device in a spindle unit for machine tools having a main spindle rotatably supported in a spindle head, the tool-clamping device comprising:
   an adapter disposed at a front end of the main spindle;
   a tool holder for holding a rotary tool;
   a short columnar lug integrally formed with the adapter;
   a cylindrical hole formed in the tool holder so as to be shrinkage-fitted on the columnar lug, wherein the adapter is made of a material having a coefficient of thermal expansion less than a coefficient of thermal expansion of a material of the tool holder; and
   rapid heating means and rapid cooling means for respectively heating and cooling the tool holder so as to enable a rotary tool to be replaceably held by a front end of the main spindle.

5. A tool-clamping device according to claim 4, wherein the rapid heating means and the rapid cooling means are disposed in the spindle head in proximity to the front end of the main spindle.

6. A tool-clamping device according to claim 4, wherein the rapid heating means and the rapid cooling means are disposed in a tool transporter for transporting the rotary tool.

7. A tool-clamping device according to claim 4, further comprising pressing means provided in the tool transporter for urging the tool holder towards the adapter so as to enable said adapter to be engaged with said tool holder.

8. A tool-clamping device according to one of claims 4, 5 or 6, further comprising a vibrator for imparting vibration to the tool holder while the rapid heating and cooling means are heating or cooling the adapter.

9. A spindle unit for machine tools comprising:
   a solid shaft main spindle formed of a rigid material;
   a spindle head rotatably supporting the main spindle;
   bearing means fashioned of a material which generates a small amount of heat;
   an adapter shrinkage-fitted on a front end of the main spindle and having a cylindrical hole therein coaxial to the main spindle; and
   a tool-clamping device including a tool holder having a columnar lug integrally formed thereon and adapted to be shrinkage-fitted in the cylindrical hole, wherein the tool holder is disengageable from the adapter so as to enable a replacement of the rotary tool with another rotary tool.

10. A tool clamping device in a spindle unit for machine tools having a main spindle rotatably supported in a spindle head, the tool clamping device comprising:
    an adapter disposed at the front end of the main spindle;
    a tool holder for holding a rotary tool;
    a short columnar lug integrally formed with the tool holder;
    a cylindrical hole formed in the adapter so as to be shrinkage-fitted on the columnar lug, wherein the tool holder is made of a material having a coefficient of thermal expansion less than a coefficient of thermal expansion of a material of the adapter; and
    rapid heating means and rapid cooling means for respectively heating and cooling the adapter so as to enable the rotary tool to be releasably held by the front end of the main spindle.

11. A tool clamping device according to claim 10, wherein the rapid heating means and the rapid cooling means are disposed in the spindle head in proximity to the front end of the main spindle.

12. A tool clamping device according to one of claims 10 or 11, further comprising a vibrator for imparting vibration to the tool holder while the rapid heating and cooling means are heating or cooling the tool holder.

* * * * *